United States Patent
Byun et al.

(10) Patent No.: US 12,290,207 B2
(45) Date of Patent: May 6, 2025

(54) HANDY LARGE PROCESSING JUG

(71) Applicant: SOCIETE DES PRODUITS NESTLE S.A., Vevey (CH)

(72) Inventors: Da Mi Byun, Lausanne (CH); Eric Granger, Pully (CH)

(73) Assignee: Societe des Produits Nestle S.A., Vevey (CH)

( * ) Notice: Subject to any disclaimer, the term of this patent is extended or adjusted under 35 U.S.C. 154(b) by 687 days.

(21) Appl. No.: 17/597,523

(22) PCT Filed: Jul. 10, 2020

(86) PCT No.: PCT/EP2020/069485
§ 371 (c)(1),
(2) Date: Jan. 10, 2022

(87) PCT Pub. No.: WO2021/005196
PCT Pub. Date: Jan. 14, 2021

(65) Prior Publication Data
US 2022/0248908 A1    Aug. 11, 2022

(30) Foreign Application Priority Data

Jul. 11, 2019   (EP) ................................... 19185817

(51) Int. Cl.
*A47J 43/046*   (2006.01)
*A47J 43/07*    (2006.01)

(52) U.S. Cl.
CPC ......... *A47J 43/0465* (2013.01); *A47J 43/046* (2013.01); *A47J 43/0722* (2013.01)

(58) Field of Classification Search
CPC ....................................... A47J 43/046
USPC ................................ 366/129, 130, 205, 314
See application file for complete search history.

(56) References Cited

U.S. PATENT DOCUMENTS

| | | | | |
|---|---|---|---|---|
| 58,770 A | * | 10/1866 | Butterfield | B01F 33/5011 366/130 |
| 1,280,458 A | * | 10/1918 | Hawkins | B01F 33/5011 366/130 |
| 2,102,520 A | * | 12/1937 | De Montmorency | A47J 43/27 D7/300.1 |
| 2,143,027 A | * | 1/1939 | Perry | A47G 19/2261 215/374 |

(Continued)

FOREIGN PATENT DOCUMENTS

| | | |
|---|---|---|
| CN | 2848071 | 12/2006 |
| CN | 203987592 | 12/2014 |

(Continued)

*Primary Examiner* — David L Sorkin
(74) *Attorney, Agent, or Firm* — K&L Gates LLP

(57) ABSTRACT

A machine (1) comprises a tank (10) having a cavity (10') for containing and processing a liquid food substance, such as milk or a milk-based substance. A stirring tool (15) is provided in the cavity (10) for imparting a mechanical effect on the food substance. A base (20) supports the tank (10). The base (20) has an upright outside gripping surface (21) located under the tank (10) and seizable by an adult human hand such that the base (20) with the supported tank (10) can be carried and displaced single-handed by seizure of the upright outside gripping surface (21). The tank (10) extends horizontally beyond the gripping surface (21).

14 Claims, 2 Drawing Sheets

(56) References Cited

U.S. PATENT DOCUMENTS

| | | | | |
|---|---|---|---|---|
| 5,586,676 | A * | 12/1996 | Lynd | A47G 21/145 |
| | | | | 215/390 |
| 5,639,161 | A * | 6/1997 | Sirianni | B01F 27/91 |
| | | | | 366/205 |
| 5,720,552 | A * | 2/1998 | Schindlegger | A47G 19/2205 |
| | | | | 366/314 |
| 6,056,206 | A * | 5/2000 | Whiton | A47G 21/181 |
| | | | | 239/33 |
| 6,308,718 | B1 * | 10/2001 | Pearson | A61C 15/02 |
| | | | | 366/129 |
| 6,511,031 | B2 * | 1/2003 | Lin | A47G 19/2261 |
| | | | | 248/205.5 |
| 6,962,432 | B2 * | 11/2005 | Hofeldt | A47J 43/042 |
| | | | | 366/205 |
| 7,364,348 | B1 * | 4/2008 | Jones | A47J 43/042 |
| | | | | 366/205 |
| 7,371,004 | B1 * | 5/2008 | Branson, III | A47J 43/046 |
| | | | | 366/205 |
| 7,946,752 | B2 * | 5/2011 | Swartz | A47J 43/1031 |
| | | | | 99/287 |
| 10,143,980 | B1 * | 12/2018 | Marko | B01F 35/51 |
| 2007/0262182 | A1 | 11/2007 | de Groote et al. | |
| 2009/0147615 | A1 * | 6/2009 | Parias Cruz | B65D 81/3876 |
| | | | | 366/130 |

FOREIGN PATENT DOCUMENTS

| | | |
|---|---|---|
| CN | 107307763 | 11/2017 |
| EP | 2080463 A1 | 7/2009 |
| JP | 2001520901 A | 11/2001 |
| JP | 2008545467 A | 12/2008 |
| JP | 2010527671 A | 8/2010 |
| JP | 2013135730 A | 7/2013 |
| JP | 2018508324 A | 3/2018 |
| JP | 2018532443 A | 11/2018 |
| WO | 2011090370 | 7/2011 |
| WO | 2011113082 A1 | 9/2011 |

* cited by examiner

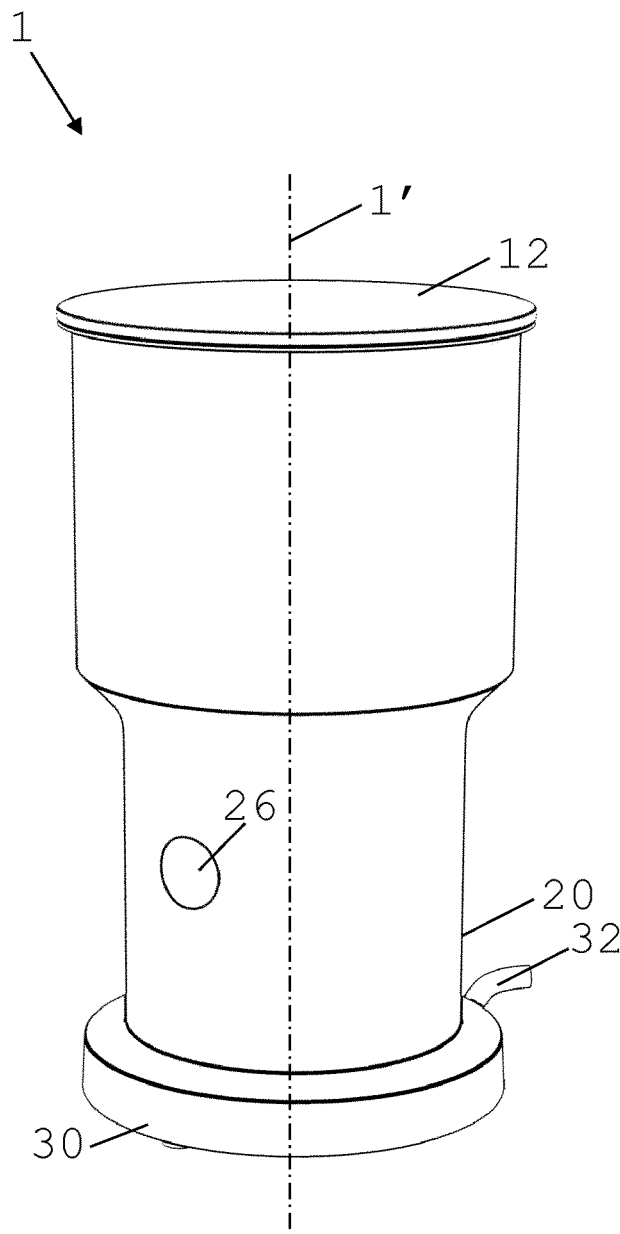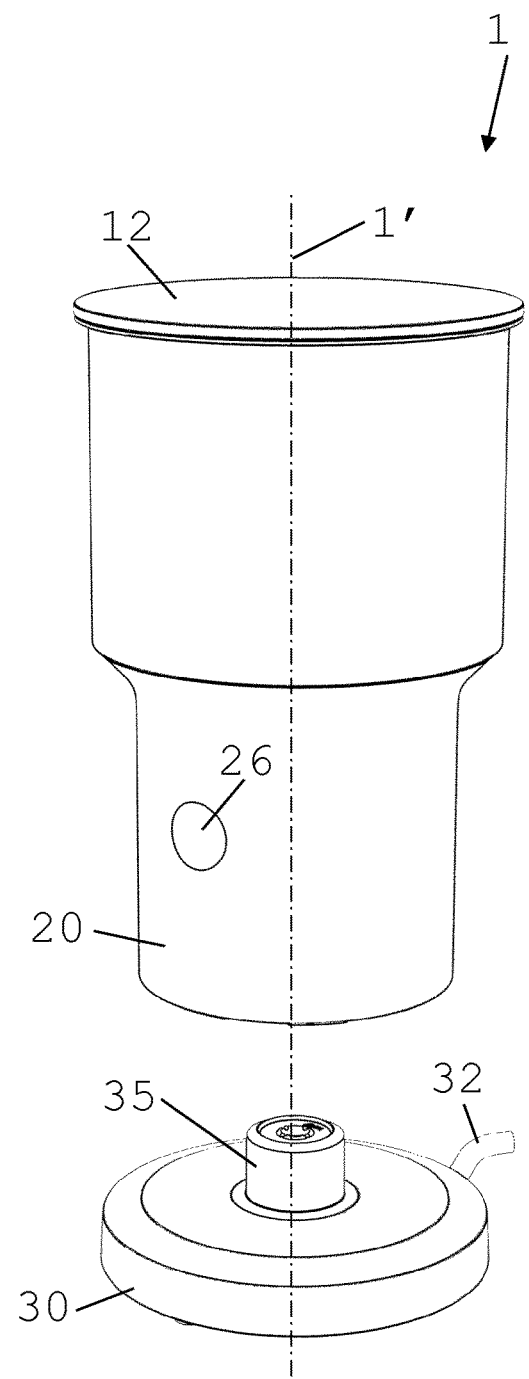
Fig. 1
Fig. 2

HANDY LARGE PROCESSING JUG

CROSS REFERENCE TO RELATED APPLICATIONS

The present application is a National Stage of International Application No. PCT/EP2020/069485, filed on Jul. 10, 2020. which claims priority to European Patent Application No. 19185817.4, filed on Jul. 11, 2019, the entire contents of which are being incorporated herein by reference.

FIELD OF THE INVENTION

The field of the invention pertains to machines for processing a food substance, such as milk or a milk-containing substance, having a food processing receptacle that is seizable single-handed. For instance, the machine is provided with an impeller and/or a thermal management arrangement.

BACKGROUND ART

Specialty beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

Milk-based froth can be prepared in a mechanical stirring appliance. Regular cleaning of the tank of the appliance needs to be envisaged in order to remove any solid food residue. In addition, heating the milk has a tendency to increase the extent to which cooked or burnt proteins are deposited on and adhere to the surfaces.

U.S. Pat. No. 6,318,247 relates to an appliance for preparing hot beverages or food with stirring such as hot chocolate, for example. Other devices for stirring food products are described in patent documents WO 2004/043213 or DE 196 24 648. Stirring systems with a magnetic engagement type are described in documents U.S. Pat. No. 2,932,493, DE 1 131 372, U.S. Pat. Nos. 4,537,332 and 6,712,497. DE 89 15 094 relates to a refrigerated pot for dispensing a milk-based beverage. U.S. Pat. No. 3,356,349 discloses a stirring device that has a heated tank, magnetic drive means positioned under the tank for driving a hub located in the middle of the tank.

Further examples of beverage processing appliances using stirring systems, in particular magnetically driven stirring systems, are disclosed in WO 2016/202814, WO 2016/202815, WO 2016/202816, WO 2016/202817, WO 2018/108804 and WO 2018/108807.

An improved appliance for preparing froth from a milk-based liquid or milk has been proposed in WO 2006/050900, WO 2008/142154, WO 2010/023313, WO 2011/039222, WO 2011/039224 and WO 2017/216133. The device has: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimise circulation of the milk during frothing.

Heat can be provided into the processing tank by using an induction system, e.g. as disclosed in WO 2019/101765.

It has been proposed, as described in WO 2009/074555 and WO 2011/144647, to provide a coffee machine with this type of milk conditioning tank. In WO 2009/074555 the upright surface of the processing tank is profiled to facilitate hand gripping.

An architecture to favour the evacuation of unwanted heat generated by the operation of electric components of the milk frothing appliance has been disclosed in WO 2016/202818. As disclosed in WO 2018/108808 and WO 2019/101764, such appliance can also be fitted with one or more fan coolers.

WO 2017/216133, WO 2019/101765 and PCT/EP19/057841 disclose a beverage processing tank. The beverage can be heated in the tank. To dispense the processed beverage, the tank is fitted with a handle that has a connection member projecting from the tank and a generally upright elongated gripping part extending above and below the connection member.

There is still a need to improve the handling of such appliances, especially when they are configured to process large amounts of liquid food substance.

SUMMARY OF THE INVENTION

It is a preferred object of the present invention to provide a convenient to handle machine for conditioning a food substance, typically a machine able to handle larger amounts of food substance.

The invention thus relates to a machine for processing a liquid food substance, such as milk or a milk-based substance. The liquid food substance can be aqueous, e.g. containing coffee and/or chocolate and/or cacao.

The machine may be a standalone machine, e.g. directly pluggable to the mains via an electric cord, or may be integrated in a food processor arranged to process other food items or to carry out different food conditioning processes, the food processor itself being generally pluggable to the mains via an electric cord whereas the machine is a sub-part of the food processor. Such a food processor may be a beverage maker, such as a coffee maker, e.g. a beverage maker configured to prepare a beverage (such as coffee) from an ingredient capsule.

The machine of the invention may advantageously be configured to froth and/or heat and/or cool milk and optionally be associated, as a standalone machine or as an integrated machine, into a coffee maker. Standalone machines and integrated associations of milk frothing machines and coffee makers are for example disclosed in WO 2006/050900, WO 2008/142154, WO 2009/074555, WO 2010/023312 and WO 2010/023313.

Hence, the machine can be a milk frother which operates by incorporating finely divided gas bubbles, e.g. air bubbles, into milk. When the machine is configured for incorporating gas bubbles into milk, it may include an operating mode without incorporation of gas bubbles.

The machine of the invention is configured for processing a liquid food substance, such as milk or a milk-based substance.

Therefore, the machine includes a tank having a cavity for containing and processing the liquid food substance, such as milk or a milk-based substance.

The tank may have an access opening that is covered by a removable lid, e.g. via a seal. The access opening may be uncovered or free of any lid. Examples of removable lids and/or seals are disclosed in WO 2008/142154 and in PCT/EP19/057844.

The removable lid can extend over a rim of the tank and have a peripheral wall that extends downwardly to form an outside lid face. The outside lid face may have a height in the range of 0.5 to 5 cm e.g. in the range of 1.5 to 3.5 cm. The outside lid face may extend flush with an outside face of the container uncovered by the lid and/or with an outside face of the base.

The removable lid can have an upright inner wall that extends downwardly into the cavity along a or the above mentioned rim of the tank. For instance, the peripheral wall and/or the upright inner wall has a sealing member, such as an annular deformable sealing member e.g. the above mentioned seal, for sealing off the cavity of the tank. Such sealing member may include at least one of the following features: the sealing member has one or more substantially parallel sealing lips, such as annular lips arranged side-by-side; the sealing member has a tab for seizing the sealing member; and the sealing member is removable from the lid, for instance for cleaning, and mountable on the lid.

The tank can be substantially cup-shaped or bowl-shaped or cylinder-shaped, the sidewall being substantially upright and the bottom wall being substantially flat or curved.

The tank may be mechanically passive. Hence, beyond the inherent mechanical properties of the materials making its structure for containing the food substance and for being integrated or assembled in the machine, the tank may be free of any mechanically active part such as a motor or movement transformation system which may require special care for hygiene or cleaning purposes.

The machine has a stirring tool in the cavity for imparting a mechanical effect on the food substance in the cavity. The stirring tool, e.g. a passive tool, may be driven from outside the tank. The stirring tool can be drivable to rotate in the cavity at a rotational speed in the range of 300 to 10000 RPM, for instance 500 to 7500 RPM, such as 900 to 5000 RPM, e.g. 1250 to 4250 RPM.

The tank may be electrically passive. Hence, beyond the inherent electrical properties (e.g. resistive and/or inductive and/or capacitive properties) of the materials making its structure for containing the food substance and for being integratable or assembled in the machine, the tank may be free of any electric components, in particular active electric components. The inherent electrical properties of the tank may however be used in the processing of the food substance, for instance for heating and/or cooling the tank that is powered electrically or electromagnetically from an (active) source that is external to the tank.

The machine has a base that supports the tank.

The tank may be fixed or integral with the base, or separable from the base by the user, e.g. for cleaning or servicing.

By providing a tank which is mechanically and/or electrically passive (optionally with a lid that is equally passive), it can easily be cleaned, e.g. in a dishwater, without any risk of damaging electric and/or mechanic components, if the tank is separable from the base.

The same result can be achieved when the tank is inseparable (by the user) from the base that is provided with a control cavity, e.g. containing mechanical and/or electric control active constituents, such as actuators and signal processing units, which control cavity has no movable access panel sealed off by a rubber, silicone or like seal that is exposed to early wear, especially when exposed to detergents or soaps used for cleaning. Hence, the same result may be achieved, if the base contains active components that are contained in an inaccessible confinement control cavity, the base being for instance entirely moulded and/or welded around such a confinement cavity so that the cavity is completely sunk in the base's structure and separate from the environment outside the base with no access from the outside without destroying the base. In such circumstances, the base may contain in such confined inaccessible cavity an active device, e.g. an RFID-type device or the like, and still be suitable for cleaning in a dishwasher.

The base has an upright outside gripping surface, e.g. a textured or striated or corrugated or undulated or ruled or even surface to facilitate hand gripping. The outside gripping surface is located under the tank and is seizable by an adult human hand, such that the base with the supported tank can be carried and displaced single-handed by seizure of the upright outside gripping surface.

By providing a base with an outside gripping surface extending horizontally around at least a substantial part of the base, the machine does not need to be fitted with an elongated handle protruding from an outside face, for instance of the variety disclosed in WO 2006/050900 or in PCT/EP19/057841.

The tank of the invention extends horizontally beyond the outside gripping surface.

By allowing the tank to extend beyond the outside gripping surface, the volume of the tank's cavity may be correspondingly increased in a lateral fashion without affecting the ability of the gripping surface to be gripped by the adult human hand, i.e. the gripping surface is not increased with the tank's cavity volume as in prior art designs. Such a configuration permits the processing of an increased volume of liquid food substance, laterally rather than in elevation, which is advantageous for instance when air is to be incorporated into the liquid food substance during processing (e.g. to froth the liquid food substance).

The lateral extension of the tank beyond the outside gripping surface of the base may also serve as a support surface on the gripping human hand to improve seizure of the machine single handed.

The outside gripping surface may be at least substantially vertical, such as vertical or inclined thereto by an angle of less than 15 deg., for instance less than 10 deg., e.g. less than 5 deg., for example less than 2.5 deg.

The tank can have an outer horizontal tank perimeter.

The tank can extend horizontally beyond the outside gripping surface over a predominant part of its tank perimeter, e.g. over more than 50 or more than 75% of its perimeter, such as over substantially the entire perimeter, e.g. above 90 or 95% of the perimeter.

The perimeter may have a circumference in the range of 15 to 70 cm, for instance 20 to 60 cm, such as 25 to 50 cm, e.g. 30 to 40 cm.

The tank may have an upright outer tank surface and the cavity may have a height, the outer horizontal perimeter extending along the outer tank surface, the outer tank surface being horizontally located beyond the outside gripping surface over substantially its entire tank perimeter over substantially the entire cavity height. For instance, the upright outer tank surface is horizontally located beyond the outside gripping surface by a distance in the range of 0.5 to 10 cm, for instance 1 to 7 cm, such as 1.5 to 5 cm, e.g. 2 to 4 cm.

The upright outer tank surface may be at least substantially vertical, e.g. vertical or inclined thereto by an angle of less than 15 deg. For instance, the upright outer tank surface is inclined to the vertical by an angle of less than 10 deg., such as less than 5 deg., e.g. less than 2.5 deg.

The machine typically includes an outside housing. The housing may form the upright outside gripping surface. The housing may extend upright along at least part of the outer tank surface.

For instance, the housing has a substantially horizontal and/or inclined, e.g. straight or curved, intermediate portion extending from a top of the upright outside gripping surface to a bottom of the upright outer tank surface. For example, such inclined intermediate portion has an inclination to a horizontal direction in the range of 15 to 75 deg., such as 20 to 70 deg., e.g. 40 to 60 deg.

The machine may have a foot that has a bottom side configured to be placed on a substantially horizontal external support surface, such as a surface formed by a table or a shelf, during processing of the liquid food substance, and to support the base during such processing. For instance, the foot is assembled to or fixed to or integral with the base.

The base can be removably mounted to the foot. The base and the foot may have a connection.

The connection may be configured to inhibit or prevent relative pivoting of the base and the foot about an axis extending along the external support surface during processing. For instance, the connection is mechanical and/or magnetic.

The connection can be configured to conduct electric power from the foot into the base. For instance, the foot has an electric cord for connection to an external power supply, such as to the mains.

The connection may be configured to be connectable in a plug and socket fashion. For instance, the connection has a plug part of the foot and a socket part of the base, or vice versa.

The foot may extend horizontally beyond the outside gripping surface, e.g. the foot extending horizontally up to or beyond the tank. For instance, the foot extends horizontally beyond the outside gripping surface by a distance in the range of 0.5 to 15 cm, for example 1 to 10 cm, such as 1.5 to 7 cm, e.g. 2 to 3 cm.

Providing a large foot, e.g. larger than the gripping surface, may increase the stability of the machine during processing on the external processing surface.

The upright outside gripping surface can have a height along which the surface is seizable by the adult human hand for carrying and supporting single-handed the base and the tank, the height being of at least 3 cm, for instance in the range of 4 to 20 cm, such as 5 to 16 cm, e.g. 6 to 12 cm.

The machine may include, for instance within the base, an actuator that is connected or connectable to the stirring tool. The actuator may be magnetically coupled to the stirring tool, e.g. via a tank side wall and/or a bottom wall and/or top wall.

Actuators e.g. motors, control units, user-interfaces, AC/DC converters can all be comprised in the base.

The machine can comprise, for instance within the base, a thermal conditioner that is associated with a tank side wall and/or a bottom wall configured to emit thermal energy into and/or absorb thermal energy from the cavity. For instance, the thermal conditioner comprises at least one of: a resistor, e.g. a thick film resistor; an induction (e.g. cooperating with the tank side and/or bottom wall to produce inductive heat); a thermocouple; and a heat pump.

Example of suitable thermal conditioners are disclosed in WO 2006/050900, WO 2008/142154, WO 2010/023312, WO 2010/023313 and WO 2019/101765.

The machine may include, for instance within the base, a control unit, such as a processor and/or a controller, for controlling at least one of a or the above stirring tool actuator and a or the above wall-associated thermal conditioner. For instance, the control unit includes a user-interface, such as a user-interface at a or the above outside housing.

The cavity may have a volume that is greater than 200 ml, for instance in the range of 250 to 1250, such as in the range 300 to 1000 ml, e.g. in the range of 450 to 850 ml or 500 to 700 ml.

The cavity or an upright part of the stirring tool may be associated with or may include an indication arrangement for assisting an appropriate filling of the cavity with liquid food substance prior to its processing in the cavity. For instance, the indication arrangement has an indicator, e.g. a high indicator, for a maximum level for thermally conditioning such liquid food substance without frothing and/or an indicator, e.g. a low indicator, for a maximum level for frothing such liquid food substance with or without thermal conditioning. The indicator may include at least one of: a verbal sign; a sign, e.g. a pictogram, of a corresponding stirring tool, such as a tool for frothing or a tool for thermal conditioning; and a level sign.

The stirring tool may include an impelling device for frothing the liquid food substance, such as an impelling device comprising a helicoidal spring and/or an undulated plate and/or a plurality of radial frothing wings.

The stirring tool may incorporate a (e.g. non-frothing) homogenising device for homogenizing the liquid food substance during thermal conditioning thereof, such as a homogenising device comprising at least one radial homogenising arm, e.g. 2, 3 or 4 radial homogenising arms.

The stirring tool may have a or the above mentioned upright extending elongated part. For instance such part is topped with a radial protruding element e.g. a ball.

The stirring tool may include an upright arched part such as an arched part located above at least one of: a or the above mentioned impelling device and a or the above mentioned homogenising device. For instance, the upright arched part is located below a or the above mentioned upright extending elongated part.

The stirring tool may have a connection part for connection with a connection part of the tank and/or of the base to position the stirring tool in the tank. For instance, such connection parts form a plug and socket arrangement and/or magnetic connecting parts. The connection parts may be configured to position the stirring tool on a central upright axis in the cavity or in parallel to such axis.

The cavity and the stirring tool may be configured for (central) symmetric processing of the liquid food substance or for asymmetric processing. For instance, a flow perturbator is used to promote homogeneisation of the food substance during processing, e.g. by setting the stirring tool off-set relative to a central upright axis and/or by arranging obstacles in the cavity that interfere with a flow of the food substance during processing.

The stirring tool and its integration into the machine may be of the type disclosed in WO 2006/050900, WO 2008/142154, WO 2016/202814, WO 2016/202815, WO 2016/202816, WO 2016/202817, WO 2018/108804 and WO 2018/108807.

The machine may have a or the above mentioned central upright axis along which at least one of the tank, the cavity, the base and a or the above mentioned foot extends. For instance, at least one of the tank, the cavity, the base and, if present, the foot has a shape of revolution about the central upright axis, such as a cylindrical and/or conical shape and/or spherical shape.

Examples of such shapes are disclosed in WO 2008/142154 and PCT/EP19/060854.

When reference is made in the present description to an orientation or position relative to the machine or parts thereof, e.g. "above" or "below" or "vertical" or "horizontal", the orientation or position takes as a reference the position and orientation of the machine in operation to process the liquid food substance in the tank unless specified otherwise.

BRIEF DESCRIPTION OF THE DRAWINGS

The invention will now be described with reference to the schematic drawings, wherein:

FIG. 1 is a perspective side view of a machine having a tank, a base and a foot according to the invention;

FIG. 2 is a perspective side view of the machine of FIG. 1 in which the tank and the base have been separated from the foot.

DETAILED DESCRIPTION

Figure 3:
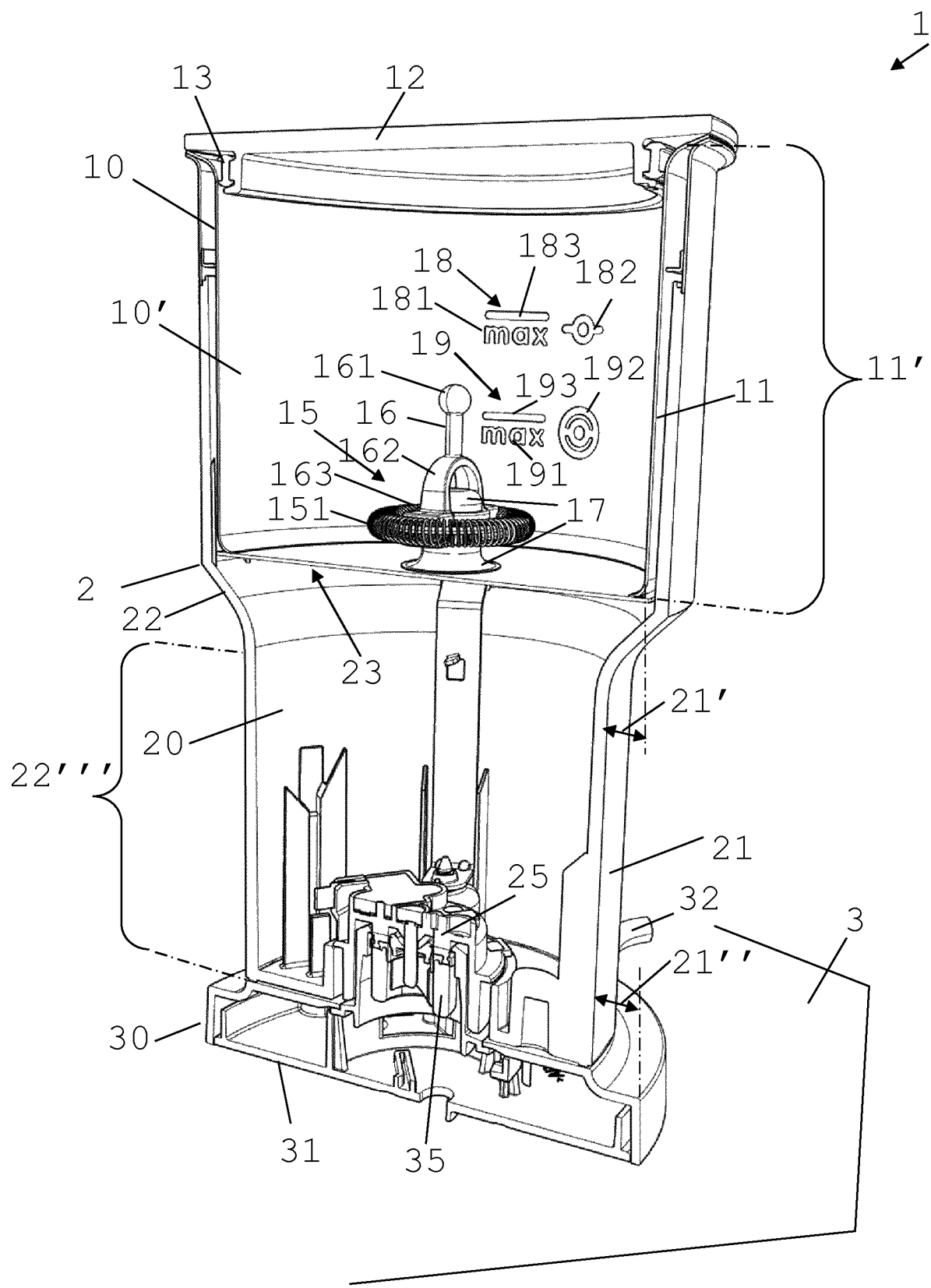
FIG. 3 is a cross-sectional perspective view of the machine shown in FIG. 1.

An exemplary embodiment of a machine 1 according to the invention is illustrated in FIGS. 1 to 3.

Machine 1 has a tank 10 with a cavity 10' for containing and processing a liquid food substance, such as milk or a milk-based substance.

Machine 1 includes a stirring tool 15 in cavity 10' for imparting a mechanical effect on the food substance in cavity 10', e.g. a stirring tool 15 driven from outside tank 10. Stirring tool 15 may be drivable to rotate in cavity 10' at a rotational speed in the range of 300 to 10000 RPM, for instance 500 to 7500 RPM, such as 900 to 5000 RPM, e.g. 1250 to 4250 RPM.

Machine 1 has a base 20 that supports tank 10. Base has an upright outside gripping surface 21, e.g. a textured or striated or corrugated or undulated or ruled or even surface 21 to facilitate hand gripping, located under tank 10 and seizable by an adult human hand such that base 20 with supported tank 10 can be carried and displaced single-handed by seizure of the upright outside gripping surface 21.

Tank 10 may have an access opening, e.g. a top access opening, that is covered by a removable lid 12 e.g. via a seal 13.

Tank 10 extends horizontally beyond outside gripping surface 21.

Outside gripping surface 21 may be at least substantially vertical, for instance vertical or inclined thereto by an angle of less than 15 deg., such as less than 10 deg., for example less than 5 deg., e.g. less than 2.5 deg.

Tank 10 may have an outer horizontal tank perimeter.

Tank 10 may extend horizontally beyond outside gripping surface 21 over a predominant part of its tank perimeter, e.g. over more than 50 or more than 75% of its perimeter, such as over substantially the entire perimeter, e.g. above 90 or 95% of the perimeter.

The perimeter may have a circumference in the range of 15 to 70 cm, for instance 20 to 60 cm, such as 25 to 50 cm, e.g. 30 to 40 cm.

Tank 10 can have an upright outer tank surface 11 and cavity 10' may have a height 11'. The outer horizontal perimeter may extend along outer tank surface 11, outer tank surface 11 being located horizontally beyond outside gripping surface 21 over substantially its entire tank perimeter over substantially the entire cavity height 11'. For instance, upright outer tank surface 11 is located horizontally beyond outside gripping surface 21 by a distance 21' in the range of 0.5 to 10 cm, such as 1 to 7 cm, e.g. 1.5 to 5 cm, for example 2 to 4 cm.

Upright outer tank surface 11 may be at least substantially vertical, for instance vertical or inclined thereto by an angle of less than 15 deg., such as less than 10 deg., e.g. less than 5 deg., for example less than 2.5 deg.

Machine 1 may include an outside housing 2 that forms the upright outside gripping surface 21, outside housing 2 extending upright along at least part of the outer tank surface 11. For instance, housing 2 includes a substantially horizontal and/or inclined intermediate portion 22, e.g. a straight or curved portion, extending from a top of the upright outside gripping surface 21 to a bottom of the upright outer tank surface 11, such as an inclined intermediate portion 22 having an inclination to a horizontal direction in the range of 15 to 75 deg., such as 20 to 70 deg., e.g. 40 to 60 deg.

Machine 1 can have a foot 30 that has a bottom side 31 configured to be placed on a substantially horizontal external support surface 3, such as a surface 3 formed by a table or a shelf, during processing of the liquid food substance, and to support base 20 during such processing. For instance, foot 30 is assembled to or fixed to or integral with base 20.

Base 20 may be removably mounted to foot 30. Base 20 and foot 30 can have a connection 25,35.

Connection 25,35 may be configured to inhibit or prevent relative pivoting of base 20 and foot 30 about an axis extending along external support surface 3 during such processing. For instance, connection 25,35 is mechanical and/or magnetic.

Connection 25,35 can be configured to conduct electric power from foot 30 into base 20. For instance, base 30 has an electric cord 32 for connection to an external power supply, such as to the mains.

Connection 25,35 may be configured to be connectable in a plug 35 and socket 25 fashion. For instance, connection 25,35 having a plug 35 part of foot 30 and a socket 25 part of base 20, or vice versa.

Foot 30 may extend horizontally beyond the outside gripping surface 21, e.g. foot 30 extending horizontally up to or beyond tank 10. For instance, foot 30 extends horizontally beyond outside gripping surface 21 by a distance 21" in the range of 0.5 to 15 cm, such as 1 to 10 cm, e.g. 1.5 to 7 cm, for example 2 to 3 cm.

Upright outside gripping surface 21 has a height 21''' along which surface 21 is seizable by the above mentioned human hand for carrying and supporting single-handed base 20 and tank 10, the height being of at least 3 cm, for instance in the range of 4 to 20 cm, such as 5 to 16 cm, e.g. 6 to 12 cm.

Machine 1 may include, for instance within base 20, an actuator that is connected or connectable to stirring tool 15. For instance, the actuator is magnetically coupled to stirring tool 15, e.g. via a tank side wall and/or a bottom wall and/or top wall.

Machine 1 may include, for instance within base 20, a thermal conditioner 23 that is associated with a tank side wall and/or a bottom wall configured to emit thermal energy into and/or absorb thermal energy from cavity 10'. For instance, the thermal conditioner comprises at least one of: a resistor, e.g. a thick film resistor 23; an induction (e.g. cooperating with the tank side and/or bottom wall to produce inductive heat); a thermocouple; and a heat pump.

Machine 1 can include, for instance within base 20, a control unit, such as a processor and/or a controller, for controlling at least one of a or the above mentioned stirring tool actuator and a or the above mentioned wall-associated thermal conditioner 23. The control unit may have a user-interface 26, such as an interface 26 at a or the above mentioned outside housing 2.

Cavity 10' may have a volume that is greater than 200 ml, for instance in the range of 250 to 1250, such as in the range 300 to 1000 ml, e.g. in the range of 450 to 850 ml or 500 to 700 ml.

Cavity 10' or an upright part 16 of stirring tool 15 may be associated with or may include an indication arrangement 18,19 for assisting an appropriate filling of cavity 10' with liquid food substance prior to its processing in cavity 10'. For instance, the indication arrangement includes an indicator 18, e.g. a high indicator 18, for a maximum level for thermally conditioning the liquid food substance without frothing and/or an indicator 19, e.g. a low indicator 19, for a maximum level for frothing the liquid food substance with or without thermal conditioning. The indicator may comprise at least one of: a verbal sign 181,191; a sign, e.g. a pictogram 182,192, of a corresponding stirring tool; and a level sign 183,193.

Stirring tool 15 may include an impelling device 151,192 for frothing the liquid food substance. For instance, the impelling device includes a helicoidal spring and/or an undulated plate and/or a plurality of radial frothing wings.

Stirring tool 15 can include a homogenising device 182 for homogenizing the liquid food substance during thermal conditioning thereof, such as a homogenising device comprising at least one radial homogenising arm, e.g. 2, 3 or 4 radial homogenising arms.

Stirring tool 15 may have a or the above mentioned upright extending elongated part 16. Part 16 can be topped with a radial protruding element 161, e.g. a ball.

Stirring tool 15 can have an upright arched part 162 such as an arched part located above at least one of a or the above mentioned impelling device 151,192 and a or the above mentioned homogenising device 182. For instance, the upright arched part 162 is located below a or the above mentioned upright extending elongated part 16.

Stirring tool 15 may incorporate a connection part 163 for connection with a connection part 17 of tank 10 and/or of base 20 to position stirring tool 15 in tank 10, such as connection parts 163,17 forming a plug and socket arrangement and/or magnetic connecting parts. For instance, connection parts 163,17 are configured to position stirring tool 15 on a central upright axis 1' in cavity 10' or in parallel to such axis 1'.

Machine 1 may have a or the above mentioned central upright axis 1' along which at least one of tank 10, cavity 10', base 20 and (when present) a or the above mentioned foot 30 extends. At least one of tank 10, cavity 10', base 20 and, if present, foot 30 can have a shape of revolution about central upright axis 1' such as a cylindrical and/or conical shape and/or spherical shape.

The invention claimed is:

1. A machine comprising:
   a tank having a cavity for containing and processing a liquid food,
   a stirring tool in the cavity for imparting a mechanical effect on a food substance in the cavity, and
   a base supporting the tank, the base having an upright outside gripping surface located under the tank and seizable by an adult human hand such that the base with the tank can be carried and displaced single-handed by seizure of the upright outside gripping surface,
   the tank extends horizontally beyond the upright outside gripping surface;
   wherein the tank has an outer horizontal tank perimeter and wherein:
      the tank extends horizontally beyond the upright outside gripping surface over a predominant part of the outer horizontal tank perimeter; and/or
      the outer horizontal tank perimeter has a circumference in the range of 15 to 70 cm; and
   wherein the tank has an outer tank surface, the cavity has a cavity height, the outer horizontal tank perimeter extending along the outer tank surface, the outer tank surface being located horizontally beyond the upright outside gripping surface over the outer horizontal tank perimeter over the cavity height; and
   wherein an outside housing forms the upright outside gripping surface, the outside housing extending upright along at least part of the outer tank surface, the outside housing comprising a substantially horizontal and/or inclined intermediate portion extending from a top of the upright outside gripping surface to a bottom of the outer tank surface.

2. The machine of claim 1, wherein the outer tank surface is at least substantially vertical.

3. The machine of claim 1, which has a foot that has a bottom side configured to be placed on a substantially horizontal external support surface.

4. The machine of claim 3, wherein the base is removably mounted to the foot, the base and the foot having a connection that is configured:
   to inhibit or prevent relative pivoting of the base and the foot about an axis extending along the substantially horizontal external support surface during such processing;
   to conduct electric power from the foot into the base; and/or
   to be connectable in a plug and socket fashion.

5. The machine of claim 3, wherein the foot extends horizontally beyond the upright outside gripping surface.

6. The machine of claim 1, wherein the upright outside gripping surface has a height along which the upright outside gripping surface is seizable by the human hand for carrying and supporting single-handed the base and the tank, the height being of at least 3 cm.

7. The machine of claim 1, which comprises, within the base, at least one of:
   an actuator that is connected or connectable to the stirring tool; and
   a thermal conditioner that is associated with a tank side wall and/or a bottom wall configured to emit thermal energy into and/or absorb thermal energy from the cavity.

8. The machine of claim 1, which comprises a control unit configured for controlling at least one of a stirring tool actuator and a wall-associated thermal conditioner.

9. The machine of claim 1, wherein the cavity has a volume that is greater than 200 ml.

10. The machine of claim 1, wherein the cavity or an upright part of the stirring tool is associated with or comprises an indication arrangement for assisting an appropriate filling of the cavity with the food substance prior to processing in the cavity.

11. The machine of claim 1, wherein the stirring tool comprises at least one of:
   an impelling device for frothing the liquid food substance;
   a homogenising device for homogenizing the food substance during thermal conditioning thereof;
   an upright extending elongated part;
   an upright arched part; and a connection part for connection with a connection part of the tank and/or of the base to position the stirring tool in the tank.

12. The machine of claim 1, which has a central upright axis along which at least one of the tank, the cavity, the base and a foot extends.

13. The machine of claim 11, wherein the stirring tool comprises the homogenising device, and the homogenising device comprises at least one radial homogenising arm.

14. The machine of claim 11, wherein the stirring tool comprises the upright extending elongated part, and the upright extending elongated part comprises a part topped with a radial protruding element.

* * * * *